US007749311B2

United States Patent
Saito et al.

(10) Patent No.: US 7,749,311 B2
(45) Date of Patent: Jul. 6, 2010

(54) SYSTEM AND METHOD FOR TREATING DUST CONTAINED IN EXTRACTED CEMENT KILN COMBUSTION GAS

(75) Inventors: Shinichiro Saito, Kumagaya (JP); Keizo Fujiwara, Chofu (JP)

(73) Assignee: Taiheiyo Cement Corporation, Tokyo (JP)

( * ) Notice: Subject to any disclaimer, the term of this patent is extended or adjusted under 35 U.S.C. 154(b) by 709 days.

(21) Appl. No.: 11/663,393

(22) PCT Filed: Sep. 20, 2005

(86) PCT No.: PCT/JP2005/017258

§ 371 (c)(1),
(2), (4) Date: Mar. 20, 2007

(87) PCT Pub. No.: WO2006/035630

PCT Pub. Date: Apr. 6, 2006

(65) Prior Publication Data

US 2008/0092735 A1    Apr. 24, 2008

(30) Foreign Application Priority Data

Sep. 29, 2004   (JP) .............................. 2004-283347

(51) Int. Cl.
B01D 50/00    (2006.01)
(52) U.S. Cl. .......................... 95/288; 55/315; 55/315.1; 55/466
(58) Field of Classification Search .................. 55/315, 55/315.1, 337, 466; 95/288
See application file for complete search history.

(56) References Cited

U.S. PATENT DOCUMENTS 6,017,213 A  *  1/2000  Murata et al. ................ 432/116
2002/0083831 A1    7/2002  Jorget et al.

FOREIGN PATENT DOCUMENTS

| EP | 1219336 A1 | 7/2002 |
|----|------------|--------|
| JP | 9-227184 A | 9/1997 |
| JP | 11-100243 A | 4/1999 |
| JP | 2002-282639 A | 10/2002 |

* cited by examiner

Primary Examiner—Robert A Hopkins
(74) Attorney, Agent, or Firm—Stetina Brunda Garred & Brucker

(57) ABSTRACT

A treatment system to efficiently remove lead from dust contained in extracted cement kiln combustion gas while reducing facility and running costs. A treatment system 1 comprising a probe 3 for extracting a part of combustion gas, while cooling it, from a kiln exhaust gas passage, which runs from an inlet end of a cement kiln to a bottom cyclone; a first classifier 5 for separating coarse powder from dust contained in the combustion gas extracted; a dust collector 7 for collecting dust from the extracted gas containing fine powder discharged from the first classifier 5; and a second classifier 8 for dividing dust discharged from the dust collector 7 into fine powder and coarse powder, and others. Since more lead is distributed on the fine powder side classified by the second classifier 8, lead can efficiently be removed without using chemicals and the like. The fine powder classified by the classifier 8 may be desalted by washing; high-lead-level cake obtained after the washing can be recycled; or salt water can be added to a cement mill. The coarse powder may be added to a cement grinding process or returned to cement material grinding process after the desaltation through washing.

9 Claims, 4 Drawing Sheets

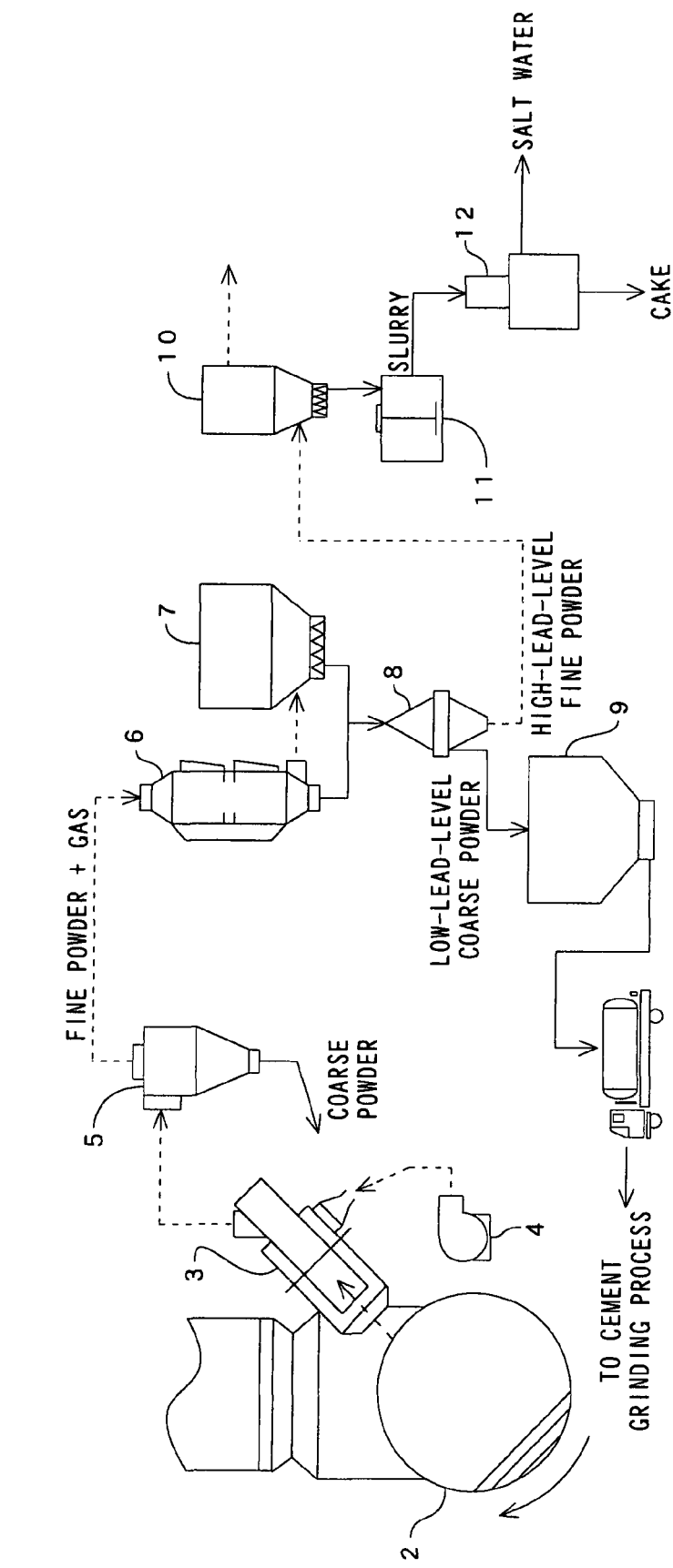
[FIG. 1]

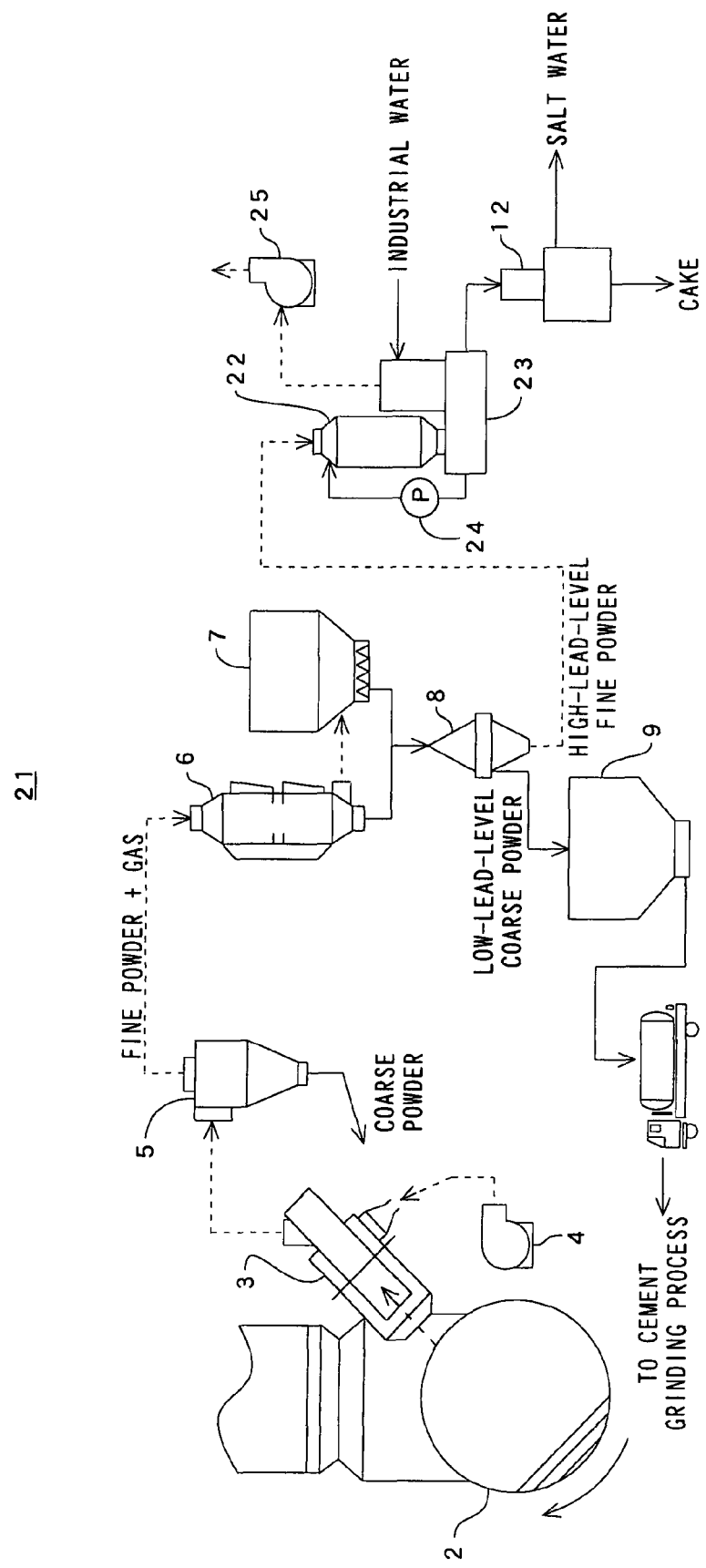
[FIG. 2]

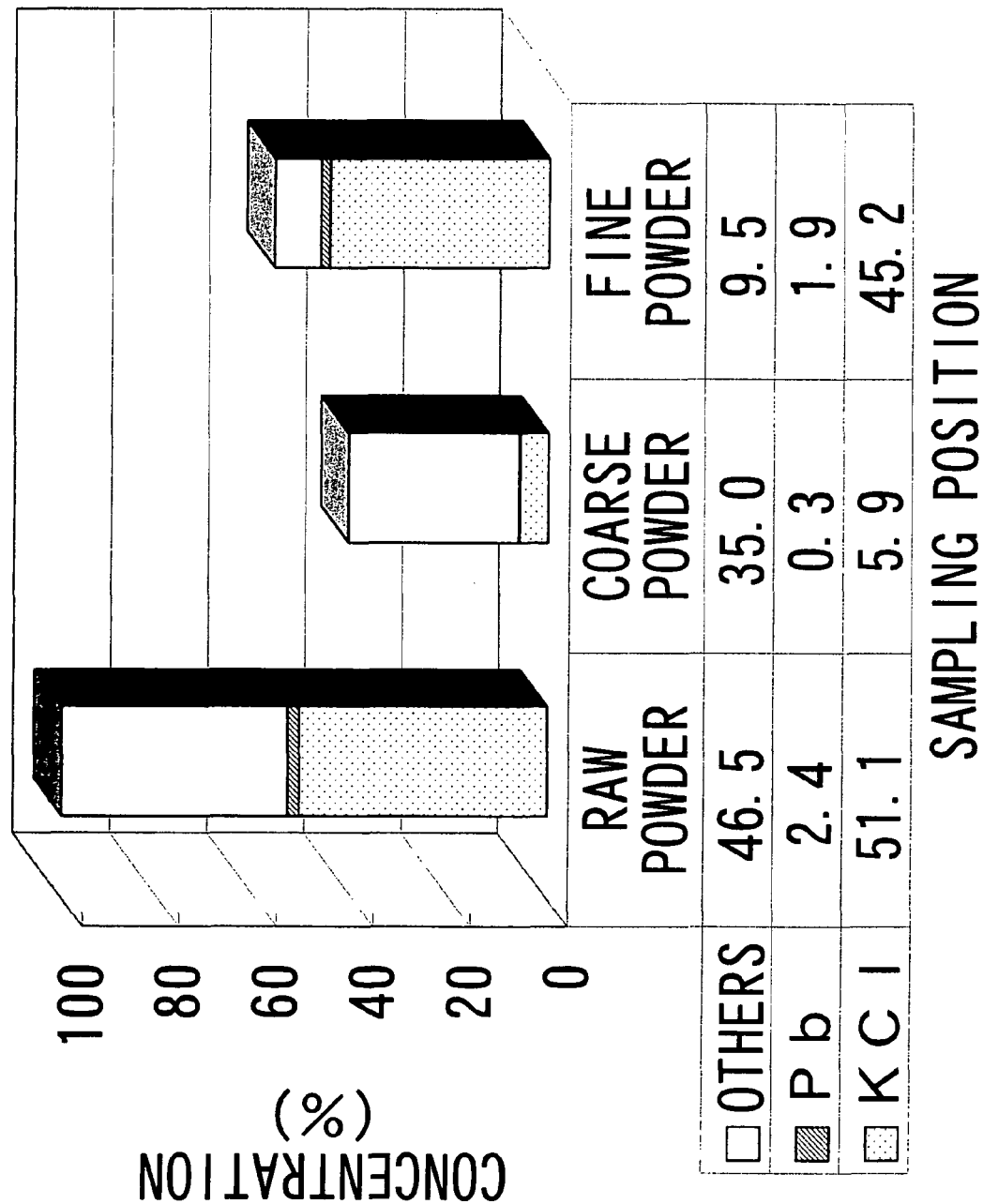
[FIG. 3]

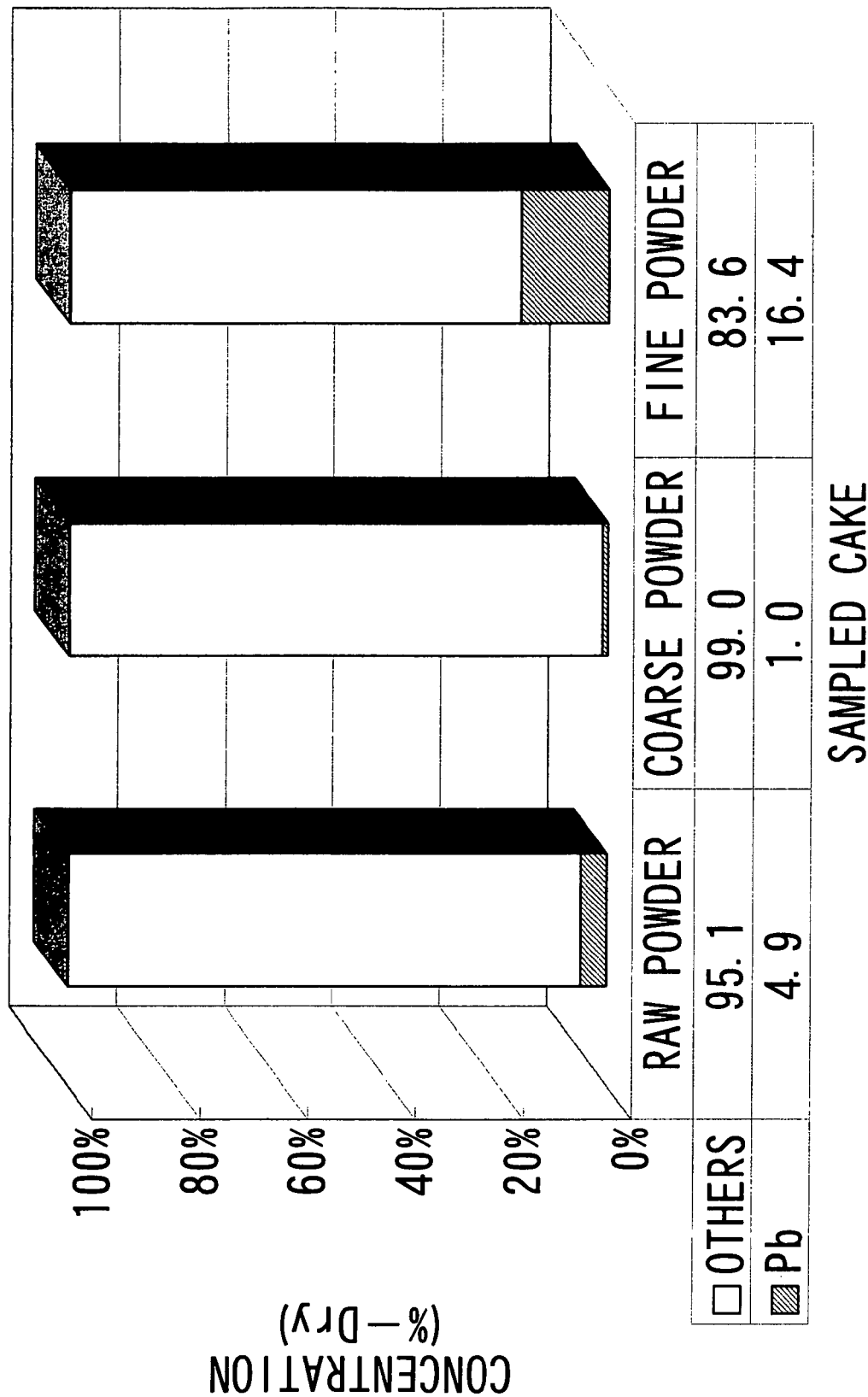

SYSTEM AND METHOD FOR TREATING DUST CONTAINED IN EXTRACTED CEMENT KILN COMBUSTION GAS

CROSS-REFERENCE TO RELATED APPLICATIONS

The present application claims priority to International Application No. PCT/JP2005/017258 which was filed on Sep. 20, 2005 and which claims priority to Japanese Patent Application No. 2004-283347 filed Sep. 29, 2004.

STATEMENT RE: FEDERALLY SPONSORED RESEARCH/DEVELOPMENT

Not Applicable

BACKGROUND OF THE INVENTION

1. Technical Field

The present invention relates to a system and a method for treating dust contained in extracted cement kiln combustion gas, and more particularly to a method for removing chlorine from a part of combustion gas extracted from a kiln exhaust gas passage, which runs from an inlet end of a cement kiln to a bottom cyclone, and efficiently removing lead from dust included in the extracted combustion gas.

2. Background Art

It is noticed that chlorine, sulfur, alkali and the like cause troubles such as preheater clogging in cement manufacturing facilities, and especially chlorine has the most harmful effect, so that cement kiln chlorine bypass systems are used in order to remove chlorine by extracting a part of combustion gas from a kiln exhaust gas passage, which runs from an inlet end of a cement kiln to a bottom cyclone.

In this chlorine bypass system, more chlorine is distributed on fine powder side of the dust, which is generated by cooling the extracted exhaust gas, so that the dust is separated into coarse powder and fine powder by a classifier, the coarse powder is returned to a cement kiln system, and the fine powder (chlorine bypass dust) containing separated potassium chloride and the like are recovered, and are added to a cement grinding mill system (as exemplarily described in the first patent document).

However, in recent years, recycling of waste through conversion to cement raw material or fuel has been promoted, which increases the quantity of harmful lead brought to cement kilns as the quantity of the treated waste increases. As a result, lead concentration in cement may exceed a management standard.

To remove heavy metal such as lead from chlorine bypass dust or the like, in the past, for example, a technique is described in the second patent document. The technique comprises the steps of: adding water to dust contained in kiln combustion gas; utilizing solid material deposited in the first slurry for a cement raw material and the like after adjusting the pH thereof to 12, which is optimum for depositing Cd in the dust; adding carbon dioxide to the first slurry to generate the second slurry of which pH is 9, which is optimum for depositing lead; and utilizing solid material deposited in the second slurry for a cement raw material and the like.

In addition, in order to provide a treating method for effectively recovering lead and the like included in waste material, a method is described in the third patent document. The method comprises the steps of: adding sulfuric acid, hydrochloric acid, nitric acid or carbon dioxide to filtrate, which is generated after washing waste material, including heavy metals so as to deposit the heavy metals included in the filtrate as hydroxide, sulfate or carbonate; eluting the heavy metals through alkali leaching of deposited sludge; and neutralizing or sulfurizing the filtrate to recover the heavy metals including lead in the filtrate through deposition.

Further, in order to effectively separate and remove chlorine-containing compounds and lead-containing compounds included in waste material, a method is described in the fourth patent document. The method comprises: a washing process for washing waste material; an alkaline elution process for alkaline-eluting filtered solid material; a lead removal process for dividing lead from the filtrate through deposition; a calcium removal process for dividing calcium from the filtrate from which lead is removed by depositing the calcium; and a chloride recovery process for recovering chloride by heating the filtrate to separate chloride.

In addition, in the fifth patent document, to improve heavy metal recovery efficiency while maintaining high desalting effect and controlling elution of heavy metals at the washing treatment of waste material such as dust, a method for treating waste material is described. The method controls elution of heavy-metal salt and desalts waste material while adjusting pH of water-soluble slurry (suspension with water-soluble solid) included in the waste material between 8.5 and 13 in a treatment process for desalting waste material including chlorine and heavy metals.

Patent document 1: World Patent Publication WO97/21638 pamphlet
Patent document 2: Japanese Patent 2764508 gazette
Patent document 3: Japanese Patent Publication 2002-11429 gazette
Patent document 4: Japanese Patent Publication 2003-1218 gazette
Patent document 5: Japanese Patent Publication 2002-18394 gazette

BRIEF DESCRIPTION OF DRAWINGS

FIG. 1 is a flowchart showing an embodiment of the treatment system according to the present invention;

FIG. 2 is a flowchart showing the second embodiment of the treatment system according to the present invention;

FIG. 3 is a graph for explaining lead removal effect according to the present invention, which compares lead and potassium chloride contents of dust contained in extracted cement kiln combustion gas fed to the ultrafine powder classifier, and in the coarse and the fine powders classified by the ultrafine powder classifier; and FIG. 4 is a graph for explaining lead removal effect according to the present invention, which compares respective lead content of cake after washing the respective powder shown in FIG. 3.

BRIEF SUMMARY OF THE INVENTION

Problems to be Solved by the Invention

However, in the conventional methods for removing lead described above, it is necessary to install a facility for slurring dust, a depositor such as a storage tank, a washer and the like, so that facility cost rises. In addition to the operation of the above facilities, various chemicals and others should be added, which causes running cost also to rise.

The present invention has been made in consideration of the above problems in the conventional techniques, and the object thereof is to provide an apparatus and a method for efficiently removing lead from dust contained in extracted cement kiln combustion gas with low facility and running costs.

Means for Solving Problems

To achieve the above object, the present invention relates to a system for treating gas extracted from cement kiln, and the system is characterized by comprising: a probe for extracting a part of combustion gas, while cooling it, from a kiln exhaust gas passage, which runs from an inlet end of a cement kiln to a bottom cyclone; a first classifier for separating coarse powder from dust contained in the combustion gas extracted by the probe; a dust collector for collecting dust of the extracted gas containing fine powder discharged from the first classifier; and a second classifier for dividing the dust discharged from the dust collector into fine powder and coarse powder.

With the present invention, the coarse powder of the dust included in combustion gas extracted by the probe while cooling it in the probe is separated by the first classifier; the dust including fine powder discharged from the first classifier is separated into fine powder and coarse powder by the second classifier; and more lead is distributed on the fine powder side which is classified by the second classifier, so that lead is removed efficiently with a facility with simple construction. In addition, in the present invention, it is unnecessary to add chemicals and the like, which also keeps running cost low.

The above system for treating gas extracted from cement kiln combustion gas may further comprise: a dry dust collector for collecting the fine powder separated by the second classifier; a dissolution tub for dissolving dust collected by the dry dust collector into water; and a solid/liquid separator for solid/liquid separating slurry discharged from the dissolution tub.

With the above construction, it is possible that the fine powder separated in the second classifier is collected by the dry dust collector; the collected fine powder is dissolved into water in the dissolution tub; and the slurry discharged from the dissolution tub is solid/liquid separated in the solid/liquid separator to obtain a high-lead-level cake and salt water. The cake can be rematerialized in refineries, and the obtained salt water can be added to cement mills for instance.

The above system for treating gas extracted from cement kiln may further comprise: a wet dust collector for collecting the fine powder separated by the second classifier; and a solid/liquid separator for solid/liquid separating slurry discharged from the wet dust collector. With this, high-lead-level cake and salt water can be obtained as in the above construction.

In the above system for treating gas extracted from cement kiln, the gas discharged from the second classifier may be returned to the second classifier, and can be utilized for dispersion and classification in the second classifier. With this, it is possible to prevent clogging of the classifiers caused by sticking dust contained in extracted cement kiln combustion gas, of which deliquescent and hygroscopicity are significant, and to prevent inability in classification caused by hardening of the dust.

In addition, the present invention relates to a method for treating dust contained in extracted cement kiln combustion gas, and the method is characterized by comprising the steps of: extracting a part of combustion gas, while cooling it, from a kiln exhaust gas passage, which runs from an inlet end of a cement kiln to a bottom cyclone; separating coarse powder of dust contained in the part of extracted combustion gas; collecting dust of the extracted combustion gas containing fine powder; and dividing the collected dust into fine powder and coarse powder. With this method, as described above, it is possible to distribute more lead on the fine powder side, and to remove it efficiently.

In the above method for treating dust contained in extracted cement kiln combustion gas, the dust that is collected from the extracted gas containing the fine powder obtained after separating the coarse powder may be separated into fine powder with high lead content of 0.5 μm or more and 5 μm or less in average diameter and coarse powder.

The above method for treating dust contained in extracted cement kiln combustion gas may further comprises the steps of: desalting the fine powder, which is obtained by dividing the dust collected from the extracted gas containing the fine powder into the fine powder and the coarse powder, through washing; and recycling cake obtained after the washing.

The above method for treating dust contained in extracted cement kiln combustion gas may further comprises a step selected from the group consisting of: adding salt water obtained after the washing to a cement mill; discharging the salt water to sewage after effluent treatment; and collecting industrial salt in a salt recovery process.

The above method for treating dust contained in extracted cement kiln combustion gas may further comprises a step selected from the group consisting of: adding the coarse powder, which is obtained by dividing dust collected from the extracted gas containing the fine powder into the fine powder and the coarse powder, to a cement grinding process; and returning the coarse powder to a cement raw material grinding process after desalting it. Since lead level as well as chlorine level is reduced on the coarse powder side, it is possible to add the coarse powder to a cement grinding process, which makes it possible to treat it more easily due to low chlorination, and to conduct stable addition through inexpensive devices.

Effect of the Invention

As described above, with the system and the method for treating dust contained in extracted cement kiln combustion gas according to the present invention, it is possible to efficiently remove lead from dust contained in extracted cement kiln combustion gas with low facility and running costs.

DETAILED DESCRIPTION OF THE INVENTION

The Best Mode to Carry Out the Invention

FIG. 1 is a flowchart showing an embodiment of a system for treating dust contained in extracted cement kiln combustion gas (hereinafter referred to as "treatment system" for short) according to the present invention, this treatment system 1 comprises a probe 3 for extracting a part of combustion gas from a kiln exhaust gas passage, which runs from an inlet end of a cement kiln 2 to a bottom cyclone not shown, a cyclone 5 as a classifier for separating coarse powder from dust included in combustion gas extracted by the probe 3, a cooler 6 for cooling the extracted combustion gas including fine powder discharged from the cyclone 5, an ultrafine powder classifier 8 as the second dust collector for classifying dust collected by the cooler 6 and a bag filter 7, a dissolution tank 11 and a solid/liquid separator 12 for solid/liquid separating the fine powder classified by the ultrafine powder classifier 8, and so on.

The ultrafine powder classifier 8 is installed to further separate the fine powder, which is fed from the cyclone 5 via the cooler 6 and the bag filter 7 and of which average particle diameter is about 9 μm or less, into fine powder, of which average particle diameter is 0.5 μm or more and 5 μm or less (preferably 1 μm or more and 3 μm or less in average particle diameter considering lead removal efficiency and the property of the fine powder on handling), and coarse powder. As the ultrafine powder classifier 8, for example, dry-air-stream classifiers of MP-250, MP-360, MP-460 and the like manufactured by NIPPON PNEUMATIC MFG. CO., LTD. may be used. Meanwhile, as the cooler 6, dry type coolers can be used, and as the solid/liquid separator 12, common solid/liquid separators such as centrifugal separators etc. may be used.

Next, the motion of the treatment system 1 with the above-mentioned construction will be explained with reference to FIG. 1.

The gas extracted from the kiln exhaust gas passage, which runs from the inlet end of the cement kiln 2 to the bottom cyclone, is cooled in the probe 3 by cooling air from the cooling fan 4, and is introduced to the cyclone 5 to be separated into coarse powder, and fine powder of which average particle diameter is about 9 μm or less and gas. The separated low-chlorine-level coarse powder is returned to the cement kiln system.

The high-chlorine-level fine powder and the gas are cooled by the cooler 6, and dust relating to the fine powder and the gas is collected by the bag filter 7. The dust collected by the bag filter 7 and the dust discharged from the cooler 6 are classified by the ultrafine powder classifier 8, and high-lead-level fine powder of which average particle diameter is approximately 0.5 μm or more and 5 μm or less is recovered by the bag filter 10. Meanwhile, low-lead-level coarse powder classified by the ultrafine powder classifier 8 is stored in a coarse powder tank 9, and is transported to a cement grinding process by vehicles or the like. The coarse powder stored in the coarse powder tank 9 may be utilized as a cement raw material after desalted through washing.

The high-lead-level fine powder collected by the bag filter 10 is mixed with water to be slurried in the dissolution tank 11, and fed to the solid/liquid separator 12. In the solid/liquid separator 12, the slurry is solid/liquid separated into high-lead-level cake and salt water as filtrate. The high-lead-level cake can be rematerialized in refineries. The salt water may be added to cement mills; discharged to sewage after drainage processing; or recovered as industrial salt in a salt recovery process.

FIG. 2 shows a treatment system according to the second embodiment of the present invention, in the present embodiment, a wet dust collector 22, a circulation liquid tank 23 and the like are installed instead of the bag filter 10 and the dissolution tank 11 of the treatment system 1 shown in FIG. 1. A pump 24 is installed between the wet dust collector 22 and the circulation liquid tank 23 to circulate liquid generated in the wet dust collector 7 through the circulation liquid tank 23 and the pump 24. In addition, a fan 25 is installed to discharge gas that has passed the wet dust collector 22 to the atmosphere.

In the present embodiment also, the flow from the cement kiln 2 to the coarse powder tank 9 is the same as that of the first embodiment. The gas extracted from the cement kiln 2 is separated into coarse powder, and fine powder and gas in the cyclone 5. High-chlorine-level fine powder and the gas are classified in the ultrafine powder classifier 8, and the bag filter 10 recovers high-lead-level fine powder. In addition, this high-lead-level fine powder is introduced to the wet dust collector 22, and is slurried, and then, the slurry is fed to the solid/liquid separator 12. In the solid/liquid separator 12, the slurry is solid/liquid separated, and high-lead-level cake and salt water are obtained.

Embodiment

Next, the effect of treating dust contained in extracted cement kiln combustion gas by the treatment systems 1 and 21 will be explained.

FIG. 3 is a graph comparing lead (Pb) and potassium chloride (KCl) contents in dust (raw powder) contained in extracted cement kiln combustion gas fed to the ultrafine powder classifier 8, and the coarse powder and the fine powder classified by the ultrafine powder classifier 8. With the figure, it is found that 2.4% of lead contained in the raw powder is distributed to 0.3% of lead in the coarse powder and to 1.9% of lead in the fine powder respectively. Consequently, lead removal rate of (1.9/2.4)×100=79.2% can be achieved by classification with the ultrafine powder classifier 8. In addition, it is understood that besides lead, more potassium chloride is also distributed on fine powder side.

FIG. 4 is a graph comparing respective lead content in cake after washing the respective powder shown in FIG. 3. With the figure, it is understandable that high-lead-level cake can be obtained by recovering the fine powder cake, because the coarse powder cake contains only 1% of lead in comparison to 16.4% of lead in the fine powder cake.

EXPLANATION OF REFERENCE NUMBERS

1 treatment system
2 cement kiln
3 probe
4 cooling fan
5 cyclone
6 cooler
7 bag filter
8 ultrafine powder classifier
9 coarse powder tank
10 bag filter
11 dissolution tank
12 solid/liquid separator
21 treatment system
22 wet dust collector
23 circulation liquid tank
24 pump
25 fan

What is claimed is:

1. A system for treating gas extracted from cement kiln comprising:
    a probe for extracting a part of combustion gas, while cooling it, from a kiln exhaust gas passage, which runs from an inlet end of a cement kiln to a bottom cyclone;
    a first classifier for separating coarse powder from dust contained in the combustion gas extracted by said probe;
    a first dust collector for collecting dust of the extracted gas containing fine powder discharged from said first classifier;
    a second classifier for dividing said dust discharged from the dust collector into fine powder and coarse powder; and
    a second dust collector for collecting fine powder discharged from said second classifier.

2. The system for treating gas extracted from cement kiln as claimed in claim 1 further comprising:
    a dry dust collector for collecting the fine powder separated by the second classifier;
    a dissolution tub for dissolving dust collected by said dry dust collector into water; and
    a solid/liquid separator for solid/liquid separating slurry discharged from said dissolution tub.

3. The system for treating gas extracted from cement kiln as claimed in claim 1 further comprising:
   a wet dust collector for collecting the fine powder separated by the second classifier; and
   a solid/liquid separator for solid/liquid separating slurry discharged from said wet dust collector.

4. The system for treating gas extracted from cement kiln as claimed in claim 1, 2 or 3, wherein the gas discharged from the second classifier is returned to said second classifier, and is utilized for dispersion and classification in the second classifier.

5. A method for treating dust contained in extracted cement kiln combustion gas comprising the steps of:
   extracting a part of combustion gas, while cooling it, from a kiln exhaust gas passage, which runs from an inlet end of a cement kiln to a bottom cyclone;
   separating a first coarse powder from dust contained in said part of extracted combustion gas;
   collecting dust of the extracted combustion gas containing a first fine powder after said first coarse powder is separated;
   dividing said collected dust into a second fine powder and a second coarse powder; and
   collecting said second fine powder.

6. The method for treating dust contained in extracted cement kiln combustion gas as claimed in claim 5, wherein said dust that is collected from the extracted gas containing the first fine powder obtained after separating the first coarse powder is separated into the second fine powder of 0.5 µm or more and 5 µm or less in average diameter and the second coarse powder.

7. The method for treating dust contained in extracted cement kiln combustion gas as claimed in claim 5 or 6 further comprising the steps of:
   desalting said second fine powder, which is obtained by dividing the dust collected from the extracted gas containing the first fine powder into the second fine powder and the second coarse powder, through washing; and
   recycling cake obtained after said washing.

8. The method for treating dust contained in extracted cement kiln combustion gas as claimed in claim 7 further comprising a step selected from the group consisting of:
   adding salt water obtained after the washing to a cement mill;
   discharging said salt water to sewage after effluent treatment; and
   collecting industrial salt in a salt recovery process.

9. The method for treating dust contained in extracted cement kiln combustion gas as claimed in one of claims 5, 6 or 8 further comprising a step selected from the group consisting of:
   adding the coarse powder, which is obtained by dividing dust collected from the extracted gas containing the fine powder into the fine powder and the coarse powder, to a cement grinding process; and
   returning said coarse powder to a cement raw material grinding process after desalting it.

* * * * *